United States Patent Office
3,223,590
Patented Dec. 14, 1965

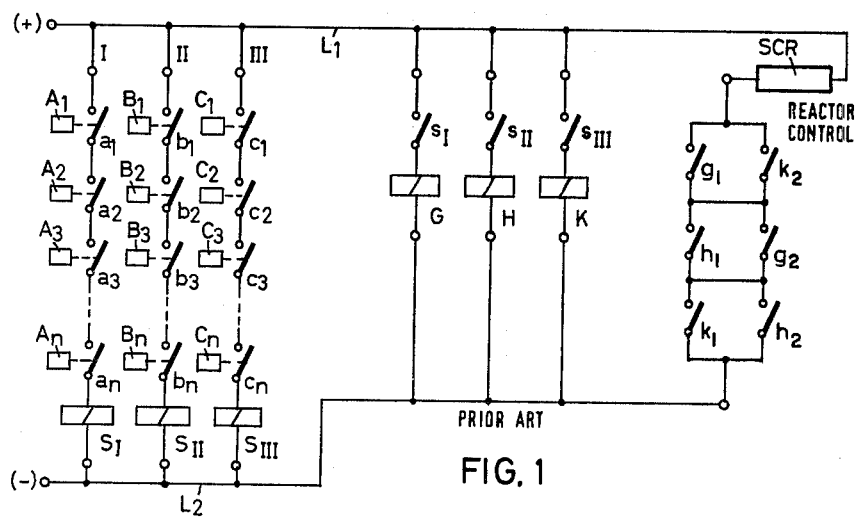
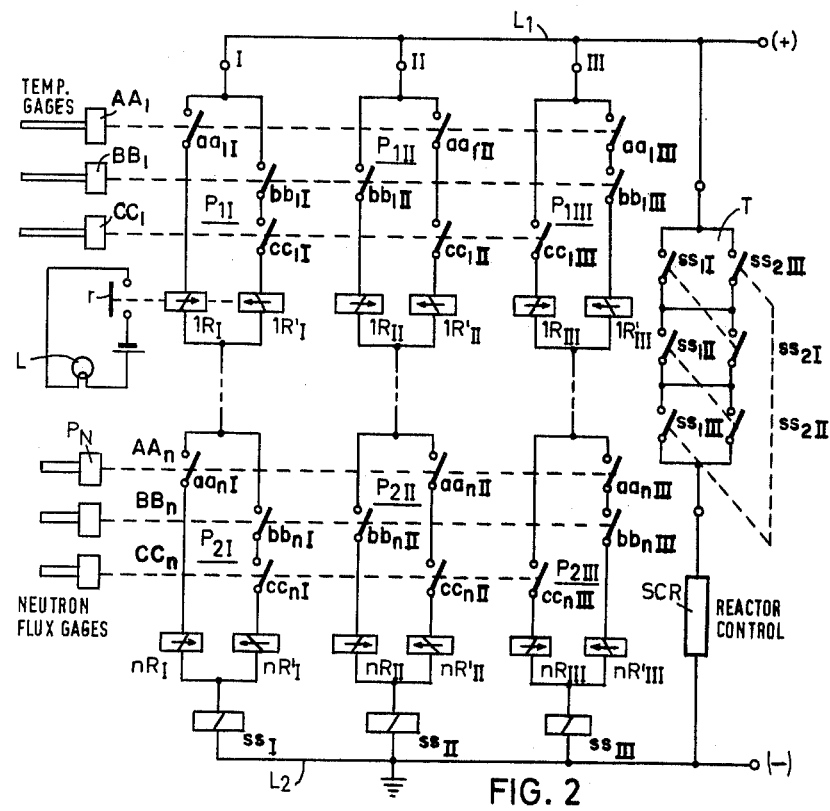

3,223,590
ELECTRIC PROTECTION SYSTEM FOR NUCLEAR REACTORS
Herbert Troeger, Baiersdorf, Germany, assignor to Siemens-Schuckertwerke Aktiengesellschaft, Berlin-Siemensstadt, Germany
Filed May 28, 1963, Ser. No. 283,895
Claims priority, application Germany, June 1, 1962, S 79,726
2 Claims. (Cl. 176—24)

My invention relates to protective electric systems for nuclear reactors.

Nuclear reactors must exhibit absolute operational reliability and must provide for rapid shutdown in the event of failure to prevent reactor accidents from assuming catastrophic proportions. It has been customary practice, therefore, to equip each reactor plant with a number of monitoring devices which allow for fully satisfactory control and supervision of the reactor operational conditions. Devices of this type automatically actuate the reactor warning equipment or safety shutoff means upon sensing a condition exceeding a predetermined maximum magnitude.

As a rule, reactor safety devices posses a plurality, for instance three probes or sensors for each condition to be monitored, thereby assuring redundant safety control against possible failures occurring in any one of these devices. Each of these sensors, or probe devices possesses a switch contact which it energizes. Conventionally, the contacts are interconnected so that the safety apparatus of the reactor will respond only when two out of three sensor devices monitoring one particular condition actuate their contacts. Thus the likelihood of an undesired shutoff, due to a defect in the sensor device, is substantially reduced.

The individual contacts of the three sensors monitoring a condition are each connected in series with the corresponding individual contacts of the three sensors monitoring other conditions to form three series shutoff lines each having a contact from each condition. The shutoff lines each actuate relay means which engage a shutoff control when a contact in two out of three lines is open.

However, the conventional system will shut off even if the open contacts in each of two lines do not belong to sensors monitoring the same condition. Thus, opening of a contact in each of two lines is not necessarily indicative of faulty reactor operation, but may merely be due to defects in two different probes. Consequently, a reactor shutoff resulting therefrom would be superfluous and in certain cases would involve unnecessary expenditure and waiting time before the reactor may again be turned on.

An object of my invention is to provide a safety circuit which obviates these shortcomings.

A more particular object of my invention is to provide a shutoff system which will reliably avoid shutdown due to improper operation of its components and which operates on a two-out-of-three basis.

According to a feature of my invention I again provide three sensors for each condition to be monitored and three parallel shutoff lines each terminating in a relay coil for actuating a two-out-of-three shutoff control between a source and the reactor. However, for each condition to be monitored and at series-connected locations, I divide each shutoff line into two parallel branches, the number of thus produced series-connected branch pairs on each line being equal to the number of conditions to be monitored and corresponding to one of the sensors, and I provide each sensor with three contacts in the corresponding branch pair by distributing them among the two branches in a different manner for each branch pair corresponding to the same condition.

According to another feature of my invention, I check the operation of the sensors by connecting in each branch warning signal means.

Other objects and advantages of the invention will be explained or become obvious from the following detailed description when read in light of the accompanying drawing wherein:

FIG. 1 is a schematic diagram of a conventional safety circuit; and

FIG. 2 is a schematic diagram of a safety circuit embodying features of the invention.

In FIGS. 1 and 2 the different conditions to be monitored are denoted by the subscripts 1, 2, 3, up to $n$, and are each measured by three measuring probes A, B and C having corresponding connecting contacts denoted by respective reference characters $a$, $b$ and $c$. Thus the sensors $A_1$, $B_1$, $C_1$ and $A_2$, $B_2$, $C_2$ . . . $A_n$, $B_n$, $C_n$ possess respective connecting contacts $a_1$, $b_1$ and $c_1$ and $a_2$, $b_2$, $c_2$ . . . $a_n$, $b_n$ and $c_n$.

In FIG. 1, all of the contacts $a$ are connected in series between a positive lead $L_1$ and a negative lead $L_2$ to form a turnoff line I. Similarly, contacts $b$ are connected in series and contacts $c$ are connected in series to form turn-off lines II and III respectively. Also connected in series in the lines I, II and III are respective coils of relays $S_I$, $S_{II}$ and $S_{III}$. These relays $S_I$, $S_{II}$ and $S_{III}$ are normally energized during reactor operation so that they operate in accordance with a fail-safe principle and their respective contacts are closed. Their respective contacts are designated $s_I$, $s_{II}$, $s_{III}$ and connected in series with the coils of power relays G, H, K, respectively, between the lines $L_1$, $L_2$. Relays G, H, K each possess two contacts designated $g_1$ and $g_2$, $h_1$ and $h_2$, $k_1$ and $k_2$, connected as shown in series with the reactor control SCR between lines $L_1$ and $L_2$ so as to operate on a two out of three basis.

If any one of the sensors or probes A, B, C responds, indicating that the limit magnitude that has been set therefor is exceeded, the corresponding relay $S_I$, $S_{II}$ or $S_{III}$ in the turnoff line is deenergized so that the operating contacts thereof will open and deenergize one of the power relays G, H, or K. If the same condition also occurs in a second turnoff line, another power relay G, H or K is deenergized by means of power contactors $s_I$, $s_{II}$ or $s_{III}$. Now, two relays, for example G and H are deenergized. This in turn opens the corresponding contacts $g$ and $h$, opening both lines between the lead $L_2$ and control SCR so that the reactor turnoff rods will be deenergized. No matter which two relays G, H, K are deenergized, they will be sufficient to open the line between lead $L_2$ and control SCR, so that any combination of open contacts in at least two shutoff lines I, II or III will deenergize the turnoff rods.

In the event of actual failure or breakdown in the reactor operation, at least two contacts in different circuit lines monitoring the same signal would respond and release the rods.

However, this release of rods is not absolutely indicative of faulty reactor operating conditions. Such release can occur if two individual faulty probes or contacts not monitoring the same condition, for example the probes $A_2$ and $C_3$ were faulty and opened their contacts simultaneously. This could happen despite the reactor's operating normally and result in an unnecessary shutdown.

The circuit according to the present invention, an embodiment of which is illustrated in FIG. 2, releases rods only in response to actuation of two monitoring probes simultaneously by the same monitored condition, so that monitoring probe failures or defects cannot result in reactor turnoff. In FIG. 2 a positive lead $L_1$ and a negative lead $L_2$ energize a reactor control SCR by means of a shutoff circuit T to be further described, and energize as well a safety circuit comprised of shutoff lines I, II, III. Again here in FIG. 2 for purposes of safety, the various conditions to be monitored are each measured by three separate devices. For example, the temperature at location 1 is measured by temperature gauges $AA_1$, $BB_1$ and $CC_1$. Similarly, three neutron flux gauges $AA_n$, $BB_n$ and $CC_n$ measure the same neutron flux. These monitoring devices are generally designated $AA_x$, $BB_x$ and $CC_x$, where $x=1, 2 \ldots n$, representing the conditions to be monitored. This corresponds substantially to the conditions in FIG. 1. However, according to the present invention as embodied in FIG. 2, each monitoring device or probe $AA_x$, $BB_x$, and $CC_x$, when subjected to a condition beyond a predetermined safe range, opens not only one contact as in FIG. 1 but rather three contacts. Thus, each monitored condition corresponds to nine contacts. Each probe $AA_x$, $BB_x$ and $CC_x$ has one contact in each shutoff line I, II and III. The contacts corresponding to each probe are designated by the lower case letter corresponding to the probe reference letter and the corresponding subscript numeral. A second subscript numeral on the contact designation indicates the shutoff line in which the particular contact appears. Thus, the probes $AA_x$, $BB_x$ and $CC_x$ possess respective contacts $aa_{xy}$, $bb_{xy}$, $cc_{xy}$, where $y=$ I, II and III, the numbers of the turnoff lines. More specifically then, the temperature gauge $AA_1$ possesses a contact $aa_{1I}$ in the line I, $aa_{1II}$ in the line II and $aa_{1III}$ in the line III. This is obvious from the FIG. 2.

For each condition to be monitored, the shutoff lines I, II, III are divided into two parallel branches or branch pairs $P_{xy}$ (where $x=1, 2 \ldots n$, the condition to be monitored, and $y=$ I, II, III, the shutoff lines). Thus each shutoff line will possess $n$ branch pairs. For each monitored condition, the contacts $aa_{xy}$, $bb_{xy}$ and $cc_{xy}$ are distributed within the branch pairs and connected within the branch pairs to form a different circuital pattern. Thus, for the condition 1 to be monitored by temperature gauges $AA_1$, $BB_1$ and $CC_1$, the contacts $aa_{1I}$, $bb_{1I}$, and $cc_{1I}$ are distributed differently within the branch pair $P_{1I}$, than are the contacts $aa_{1II}$, $bb_{1II}$, $cc_{1II}$ within the branch pair $P_{1II}$, which are in turn differently arranged than the contacts $a_{1III}$, $bb_{1III}$, $cc_{1III}$ within the branch pair $P_{1III}$.

The branch pairs $P_{xy}$ in each line are connected in series with each other and in series with respective relays $SS_I$, $SS_{II}$ and $SS_{III}$. The latter energize the switches or armatures $ss_{1I}$ and $ss_{2I}$, $ss_{1II}$ and $ss_{2II}$ and $ss_{1III}$ and $ss_{2III}$, in the circuit T controlling the reactor control SCR. The parallel branches assure that as long as only one of the probes $AA_x$, $BB_x$, $CC_x$ are energized, there will remain a path of current flow from the positive lead $L_1$ to the negative lead $L_2$, thereby maintaining current through the power relays $SS_I$, $SS_{II}$ and $SS_{III}$, thereby maintaining closed all the switches $ss_I$, $ss_{II}$ and $ss_{III}$ so as to energize the reactor control. However, if any two probes at the same monitored location, for example the probes $AA_1$ and $BB_1$ release their contacts, two branches of at least two branch pairs, for example $P_{1I}$, $P_{1II}$, in two different lines I and II, will interrupt the flow of current from the lead $L_1$ to at least two of the relays $SS_I$, $SS_{II}$, $SS_{III}$, for example the relays $SS_I$ and $SS_{II}$ and shut off the reactor.

If, for example, one probe at one monitored location and one probe at another monitored location are both opened accidentally, (and not indicating reactor breakdown), for example if the probes $AA_1$ and $BB_n$ release their respective contacts, the relays $SS_I$, $SS_{II}$ and $SS_{III}$ would still remain energized, thereby holding in their respective switches and maintaining the energy under reactor control. Such an accident in FIG. 1 would result in deenergizing the reactor control and subsequent release of the control rods, despite the fact that the conditions indicated do not result from reactor breakdown.

The circuit of FIG. 2 permits frequent checking of whether the probes $AA_x$, $BB_x$, $CC_x$ are ready to operate without disturbing the overall operation of the plant or disconnecting the turnoff line. This minimizes the risk of an undesired shut-off combination with a sudden and unexpected faulty release. For this purpose, there is provided in one branch line of each pair a relay $xRy$ and in the other branch line of the pair of relay $xR'y$. These relays are preferably provided with oppositely directed windings to reduce their inductance to a value equalling almost zero so as not to constitute a load for the contacts and thereby avoid a source of trouble. In FIG. 2 the relays operate on a single-pole basis.

The two windings $xRy$ and $xR'y$ are the two mutually opposed windings of a single differential relay. They act upon a test contact $r$ which, when closed, lights an indicator lamp L. When the contacts $aa_1$, $bb_1$ and $cc_1$ are all closed, the two relay portions $1R_I$ and $1R'_I$ are both energized so that their inductive effects cancel each other and the relay contact $r$ remains open. However, when any one of the three contacts $aa_1$, $bb_1$, $cc_1$ opens, one of of the relay portions is deenergized, and the contact $r$ closes.

It will be obvious to those skilled in the art that the device according to the invention is not restricted to the reactor engineering art but may be useful in other applications, for example the chemical industries requiring similar safety provisions. It will also be obvious to those skilled in the art that although an embodiment of the invention has been shown in detail, the invention may be embodied otherwise.

I claim:

1. A reactor safety circuit comprising three probe means for separately responding to the same reactor condition to be sensed, each of said three probe means having three contacts, three line means in mutually parallel relation each including one contact from each trio of probe means, each line means forming two parallel branches and having a relay coil in series with said parallel branches, the three contacts in each line means being distributed among the branches of the respective line means in a manner differing from the distribution in the branches of the other line means, and relay switches responding to the relay coils and adapted to be series connected between a reactor control and a source so as to cut off the reactor if two out of three of said relay coils are unenergized, said branches each including low inductance check relay means.

2. A safety circuit for a reactor having a plurality of conditions to be monitored, comprising three probe means for monitoring each condition, each probe means having three contacts, three line means in mutually parallel relation each having relay means, said lines each being divided into a plurality of series-connected parallel branch pairs corresponding to respective monitored conditions, the contacts from each probe means being included in respective branch pairs corresponding to the same monitored condition whereby each branch pair includes one from each probe monitoring the same condition, the contacts in each branch pair being distributed among the branches to form a circuit different from that formed in the other branch pairs corresponding to the same condition, relay coils in each line and in series with the branch pairs, and relay switches responding to the relay coils and adapted to be series connected between a reactor control and a source so as to cut off the reactor if two out of three of said relay coils are unenergized.

References Cited by the Examiner

UNITED STATES PATENTS 2,973,458 2/1961 Nye _____ 317—135
3,115,451 12/1963 Strong et al. _____ 176—24

OTHER REFERENCES

Siddall: "Nucleonics," vol. 15, No. 6, June 1957, pp. 124–129.

REUBEN EPSTEIN, *Primary Examiner.*

CARL D. QUARFORTH, *Examiner.*